(12) United States Patent
Schlesinger et al.

(10) Patent No.: US 7,941,700 B2
(45) Date of Patent: May 10, 2011

(54) OPERATING SYSTEM-BASED APPLICATION RECOVERY

(75) Inventors: Benny Schlesinger, Ramat Hasharon (IL); Kfir Karmon, Tel Aviv (IL); Hen Fitoussi, Tel Aviv (IL); Liat Segal, Tel Aviv (IL)

(73) Assignee: Microsoft Corporation, Redmond, WA (US)

( * ) Notice: Subject to any disclaimer, the term of this patent is extended or adjusted under 35 U.S.C. 154(b) by 235 days.

(21) Appl. No.: 12/395,723

(22) Filed: Mar. 2, 2009

(65) Prior Publication Data

US 2010/0223498 A1 Sep. 2, 2010

(51) Int. Cl.
*G06F 11/00* (2006.01)

(52) U.S. Cl. ............................... 714/15; 714/6; 714/20

(58) Field of Classification Search ................ 714/6, 15, 714/20
See application file for complete search history.

(56) References Cited

U.S. PATENT DOCUMENTS

| | | | |
|---|---|---|---|
| 5,778,443 A | 7/1998 | Swanberg et al. | |
| 5,784,628 A | 7/1998 | Reneris | |
| 5,933,838 A | 8/1999 | Lomet | |
| 5,991,856 A | 11/1999 | Spilo et al. | |
| 6,067,550 A | 5/2000 | Lomet | |
| 6,151,607 A * | 11/2000 | Lomet .................................... | 1/1 |
| 6,636,963 B1 | 10/2003 | Stein et al. | |
| 6,662,310 B2 * | 12/2003 | Lopez et al. .................... | 714/15 |
| 6,708,227 B1 | 3/2004 | Cabrera et al. | |
| 6,799,189 B2 | 9/2004 | Huxoll | |
| 6,917,963 B1 | 7/2005 | Hipp et al. | |
| 6,978,279 B1 | 12/2005 | Lomet et al. | |
| 7,424,644 B2 * | 9/2008 | Canning et al. .................. | 714/34 |
| 7,475,282 B2 | 1/2009 | Tormasov et al. | |
| 7,627,728 B1 * | 12/2009 | Roeck et al. ................... | 711/162 |
| 7,640,454 B1 * | 12/2009 | Botes .............................. | 714/19 |
| 7,716,461 B2 * | 5/2010 | Downer et al. ..................... | 713/1 |
| 7,783,914 B1 * | 8/2010 | Havemose ......................... | 714/4 |
| 2004/0034816 A1 | 2/2004 | Richard | |
| 2004/0153973 A1 * | 8/2004 | Horwitz ......................... | 715/530 |
| 2005/0268301 A1 * | 12/2005 | Kelley et al. .................. | 718/100 |
| 2006/0161603 A1 * | 7/2006 | Barrs et al. ..................... | 707/203 |
| 2007/0005915 A1 | 1/2007 | Thompson et al. | |
| 2007/0128899 A1 | 6/2007 | Mayer | |
| 2007/0162785 A1 * | 7/2007 | Downer et al. .................. | 714/15 |

(Continued)

FOREIGN PATENT DOCUMENTS

EP 1351145 10/2003

OTHER PUBLICATIONS

"Backup Software Reviews", retrieved at <<http://www.argentuma.com/backup/software/backup-mypc.html>>, Jan. 12, 2009, pp. 1-4.

(Continued)

*Primary Examiner* — Marc Duncan
(74) *Attorney, Agent, or Firm* — Toler Law Group, IP

(57) ABSTRACT

Methods, systems, and computer-readable media are disclosed for operating system-based application recovery. A particular method saves an application state of an application executing at a computer. When a failure of the application is detected, the operating system provides an option to initiate recovery of the application by reverting to the saved application state. When the option to initiate recovery is selected by a user of the computer, the operating system recovers the application by reverting to the saved application state.

19 Claims, 11 Drawing Sheets

U.S. PATENT DOCUMENTS

2008/0307347 A1* 12/2008 Cisler et al. .................. 715/771

OTHER PUBLICATIONS

"Microsoft Help and Support", "How to Use the System Restore API to Save and to Restore System Data in Visual C++", retrieved at <<http://support.microsoft.com/kb/315530>>, Mar. 19, 2008, pp. 1-7.

Ballew, Joli., "Windows XP System Restore is Easy to Use", retrieved at <<http://www.microsoft.com/windowsxp/using/helpandsupport/getstarted/ballew_03may19.mspx>>, May 19, 2003, pp. 1-4.

"Symantec", "Symantec Backup Exec System Recovery (formerly Symantec LiveState Recovery)", retrieved at <<http://eval.symantec.com/mktginfo/enterprise/fact_sheets/ent-backup_exec_system_recovery_05_2006.en-us.pdf>>, 2006, pp. 1-3.

Michael Jackman, "Are You Sleeping? Understanding hibernation, standby, and other power management features", retrieved at <<http://articles.techrepublic.com.com/5100-10878_11-1056082.html>>, Dec. 7, 2000, pp. 7.

Windows Vista Reliability and Performance Features and Improvements, retrieved at <<http://technet.microsoft.com/en-us/library/cc507843(printer).aspx>>, pp. 3, 2009.

* cited by examiner

OPERATING SYSTEM-BASED APPLICATION RECOVERY

BACKGROUND

Many computers, such as personal computers (PCs), have an operating system that supports the execution of software applications on the computer's hardware. Occasionally, a user of a computer may lose personal data, active documents, or work product following a failure of an application. Application failures commonly occur due to application errors, and may result in the loss of data and inconvenience to application users. Furthermore, although application failures may occur for many reasons, users often identify the operating system as a cause for the instability of the computer application.

Some applications attempt to compensate for application failures by offering a self-recovery feature that enables a user to revert the application following an application failure. However, not all applications offer such a self-recovery feature. Furthermore, when the self-recovery feature of a particular application behaves incorrectly or erroneously, users may not be able to recover the application following an application failure.

SUMMARY

An operating system-based application recovery system is disclosed. An operating system at a computer saves an application state of one or more applications that are executed at the computer. The operating system may save the application state automatically at fixed time intervals or when directed by a user. When an application terminates due to a failure, the operating system provides the user with an option to initiate recovery of the terminated application by reverting to the saved application state. Upon selection by the user of the recovery option, the operating system reverts the application to the saved application state.

Application states may be saved at various locations, such as at an internal computer memory, at an external memory, or at a network storage location. Application states for a particular application may also be initially saved at one computing device and loaded to another computing device having a similar operating system and application. The operating system-based application recovery system supports applications that do not have a self-recovery feature as well as applications that have their own self-recovery feature.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In a particular embodiment, a method is disclosed that includes, at an operating system of a computer executing at least one application, saving an application state of the at least one application. The method also includes, upon detection of a failure of the at least one application, displaying an option to initiate recovery of the at least one application by reverting to the saved application state.

In another particular embodiment, a system is disclosed. The system includes at least one memory and an operating system. The operating system is capable of initiating execution of at least one application. The operating system is also capable of saving at least one application state associated with the at least one application to the at least one memory. The operating system is also capable of detecting a failure event and terminating the at least one application upon detection of the failure event. The operating system is capable of displaying an option to restore the at least one application following the failure event by loading the at least one application state from the at least one memory.

In another particular embodiment, a computer-readable medium is disclosed. The computer-readable medium includes instructions, that when executed by a computer, cause the computer to execute a first application supported by an operating system of the computer. The computer-readable medium also includes instructions, that when executed by the computer, cause the computer to detect a failure event related to the first application. The computer-readable medium also includes instructions, that when executed by the computer, cause the computer to terminate the first application in response to the detected failure event related to the first application, where the first application was in a first pre-failure application state prior to termination. The computer-readable medium also includes instructions, that when executed by the computer, cause the computer to execute the first application subsequent to terminating the first application, where the first application is reverted to the first pre-failure application state by the operating system.

Figure 1:
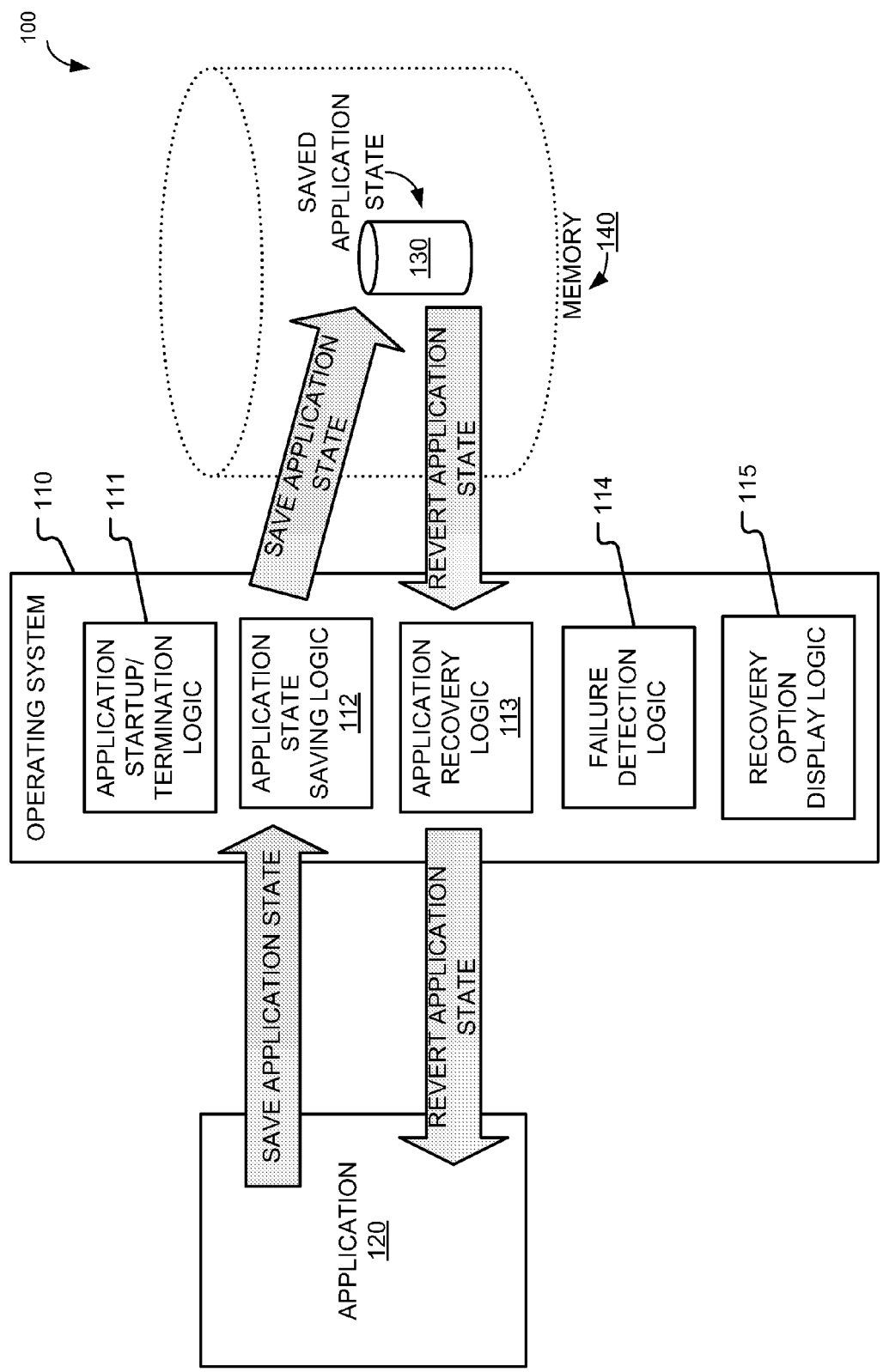
FIG. 1 is a block diagram of a particular embodiment of an operating system-based application recovery system.

FIG. 1 is a block diagram of a particular embodiment of an operating system-based application recovery system 100. The system 100 includes an operating system 110 and an application 120 configured to send data to and receive data from the operating system 110. The system 100 also includes a memory 140 configured to store a saved application state 130. Generally, the system 100 of FIG. 1 provides operating system-based application recovery.

The operating system 110 may include various logical modules configured to perform specific functionality. For example, the operating system 110 may include application startup/termination logic 111, application state saving logic 112, application recovery logic 113, failure detection logic 114, and recovery option display logic 115. The operating system 110 may be a variant of Microsoft Windows, Mac OS, Linux, Unix, Solaris, AIX, or any other operating system.

The application startup/termination logic 111 may start the execution of one or more applications (e.g., the application 120) that may be supported by the operating system 110. The application startup/termination logic 111 may also terminate the execution of one or more applications (e.g., the application 120) that may be supported by the operating system 110. In a particular embodiment, the application startup/termination logic 111 terminates the execution of the application 120 upon being notified of a failure associated with the application 120 by the failure detection logic 114.

The application state saving logic 112 may save the application state of one or more executing applications to the memory 140. For example, the application state saving logic 112 may periodically save the application state of the application 120 as the saved application state 130 at the memory 140, including saving address space information, process information, and thread information related to the application 120.

The application recovery logic 113 may recover one or more applications by reverting the one or more applications to the saved application states stored at the memory 140. For example, the application recovery logic 113 may recover the application 120 by reverting the application 120 to the saved application state 130 from the memory 140.

The failure detection logic 114 may detect the failure of one or more executing applications (e.g., the application 120). The failure detection logic 114 may also notify the application startup/termination logic 111 of the detected failure. For example, the failure detection logic 114 may notify the application startup/termination logic 111 of a failure of the application 120.

The recovery option display logic 115 may detect an application state stored at the memory 140 for an application that may have been terminated by the application startup/termination logic 111 and may display an option to initiate recovery of the application. For example, the recovery option display logic 115 may detect the saved application state 130 at the memory 140 and display an option to initiate recovery of the application 120 that may have been terminated by the application startup/termination logic 111. In a particular embodiment, the option to initiate recovery of the application 120 is displayed to a user via a display device.

In operation, the application startup/termination logic 111 may start the execution of the application 120 supported by the operating system 110. During the execution of the application 120, the application state saving logic 112 may save application state of the application 120 to the memory 140 as the saved application state 130. The saved application state 130 may include all of the information relevant to the application 120 at the particular point in time when the saved application state 130 was saved. The application state of the application 120 may be saved at any time. For example, the application state of the application 120 may be saved at fixed time intervals, randomly, in response to a user command, or when the application state changes in any way. During the execution of the application 120, the failure detection logic 114 detects a failure of the application 120 and notifies the application startup/termination logic 111 of the failure of the application 120. Upon receiving the notification of the failure of the application 120 from the failure detection logic 114, the application startup/termination logic 111 terminates the execution of the application 120. Subsequent to the termination of the application 120, the recovery option display logic 115 may detect the saved application state 130 in the memory 140 and may display an option to recover the application 120. When the option to recover the application 120 is selected by a user, the application recovery logic 113 may recover the application 120 by reverting the application 120 to the saved application state 130 from the memory 140.

It will be appreciated that the system 100 of FIG. 1 provides for operating system-based application recovery by saving application state including all of the information relevant to an application in memory, and then reverting to the saved application state in response to an application failure, upon user selection of an application recovery option. It will further be appreciated that the system 100 of FIG. 1 provides for the operating system-based recovery of both applications that do not have any recovery features of their own as well as those applications that have their own self-recovery feature. This enables the system 100 of FIG. 1 to effectively add recovery functionality to applications that have been developed without any self-recovery feature, as well as to recover an application whose self-recovery feature is functioning incorrectly or erroneously.

Figure 2:
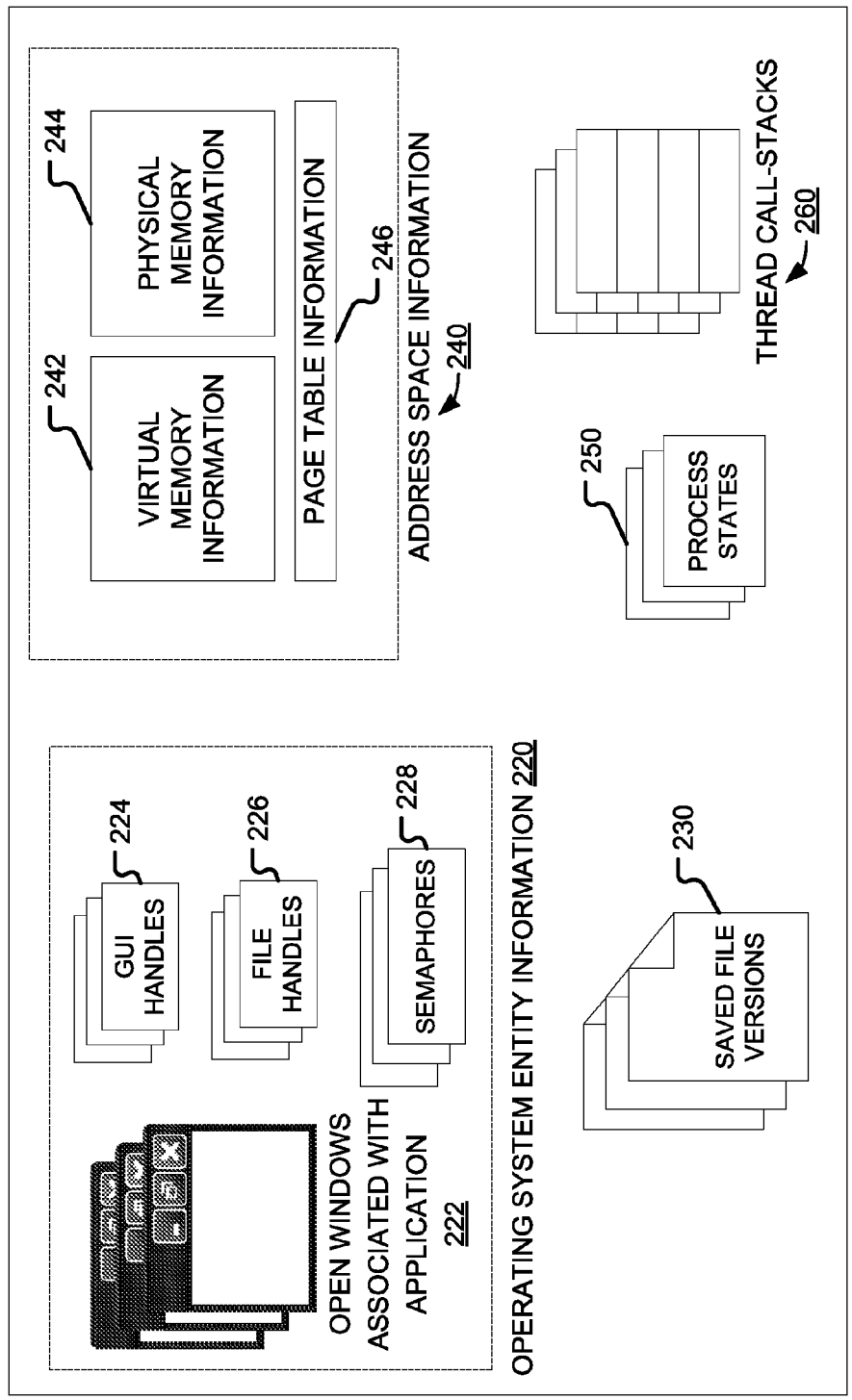
FIG. 2 is a block diagram of a particular embodiment of an application state used in operating system-based application recovery.

FIG. 2 is a block diagram 200 of a particular embodiment of an application state 210 used in operating system-based application recovery. The application state 210 may include information relevant to an application that may be used to recover the application. In an illustrative embodiment, the application state 210 may include the saved application state 130 of the application 120 of FIG. 1 and may be utilized by the operating system 110 of FIG. 1.

The application state 210 may include operating system entity information 220, one or more saved file versions 230, address space information 240, one or more process states 250, and one or more thread call-stacks 260. The operating system entity information 220 may include information related to one or more operating system entities associated with an operating system. For example, the operating system entity information 220 may include information related to one or more graphical user interface (GUI) elements associated with the application. In a particular embodiment, the operating system entity information 220 may include information regarding open windows 222 associated with the application such as window size, window location, and a maximized/minimized status. The operating system entity information 220 may also include one or more GUI handles 224, file handles 226, and semaphores 228 associated with the application.

The saved file versions 230 may include saved versions of one or more files relevant to the application corresponding to the application state 210. For example, if the application corresponding to the application state 210 is a word processing program, the saved file versions 230 may include saved versions of the files opened by the word processing program. As another example, if the application is a video editing program, the saved file versions 230 may include saved versions of video files opened by the video editing program.

The address space information 240 may include virtual memory information 242, physical memory information 244, and page table information 246. The virtual memory information 242 may include information regarding a virtual memory address space allocated by an operating system to the application corresponding to the application state 210. For example, the virtual memory information 242 may include information regarding a virtual memory address space allocated by the operating system 110 of FIG. 1 for the application 120 of FIG. 1. Allocating a virtual memory address space enables an operating system to simulate the storage of more data than can actually be contained in physical memory.

When an operating system has allocated virtual memory, the operating system may swap data that is no longer in use out of physical memory while continuing to maintain the data that is no longer in use in virtual memory. In a particular embodiment, the application state 210 may have been swapped out of physical memory by the operating system, such that the application state 210 resides only in virtual memory. The physical memory may also have a physical memory address space larger, smaller, or offset from the virtual memory address space. Virtual memory may also be paged, i.e., divided into blocks. To translate between the virtual memory address space and the physical memory address space, a page table may be used. When a page table is used, information related to the page table may be stored in the page table information 246.

The process states 250 may include the states of one or more processes that are relevant to the application corresponding to the application state 210. In a particular embodiment, the application corresponding to the application state 210 may be multi-threaded. When the application is multi-threaded, the application state 210 may include the thread call-stacks 260 for each execution thread associated with the application. Each thread call-stack may include a function call path for that execution thread.

Each item of the application state 210 may be saved each time the application state 210 is saved. For example, when the application state 210 for an application is small, each item of the application state 210 may be saved each time the application state 210 is saved without impacting system performance. Alternatively, only those items that have changed since the last time the application state 210 was saved may be saved during the subsequent saving of the application state 210. For example, when the application state 210 for an application is large, saving each item of the application state 210 each time the application state 210 is saved could result in a decrease in system performance. To avoid this decrease in system performance, only those items of the application state that have changed since the last time the application state was saved may be saved during the subsequent save operation.

It will be appreciated that the application state 210 illustrated in FIG. 2 may include the necessary information to completely revert an application following a failure of the application. For example, the application state 210 may include all of the necessary information for the operating system 110 of FIG. 1 to completely revert the application 120 of FIG. 1 following a failure of the application 120 of FIG. 1. It will thus be appreciated that the application state 210 may function as a "snapshot" of an application, containing all of the information relevant to the application at a particular point in time. Therefore, the application state 210 may enable the recovery of a failed application by an operating system without a user noticing any loss of data or other state information.

Figure 3:
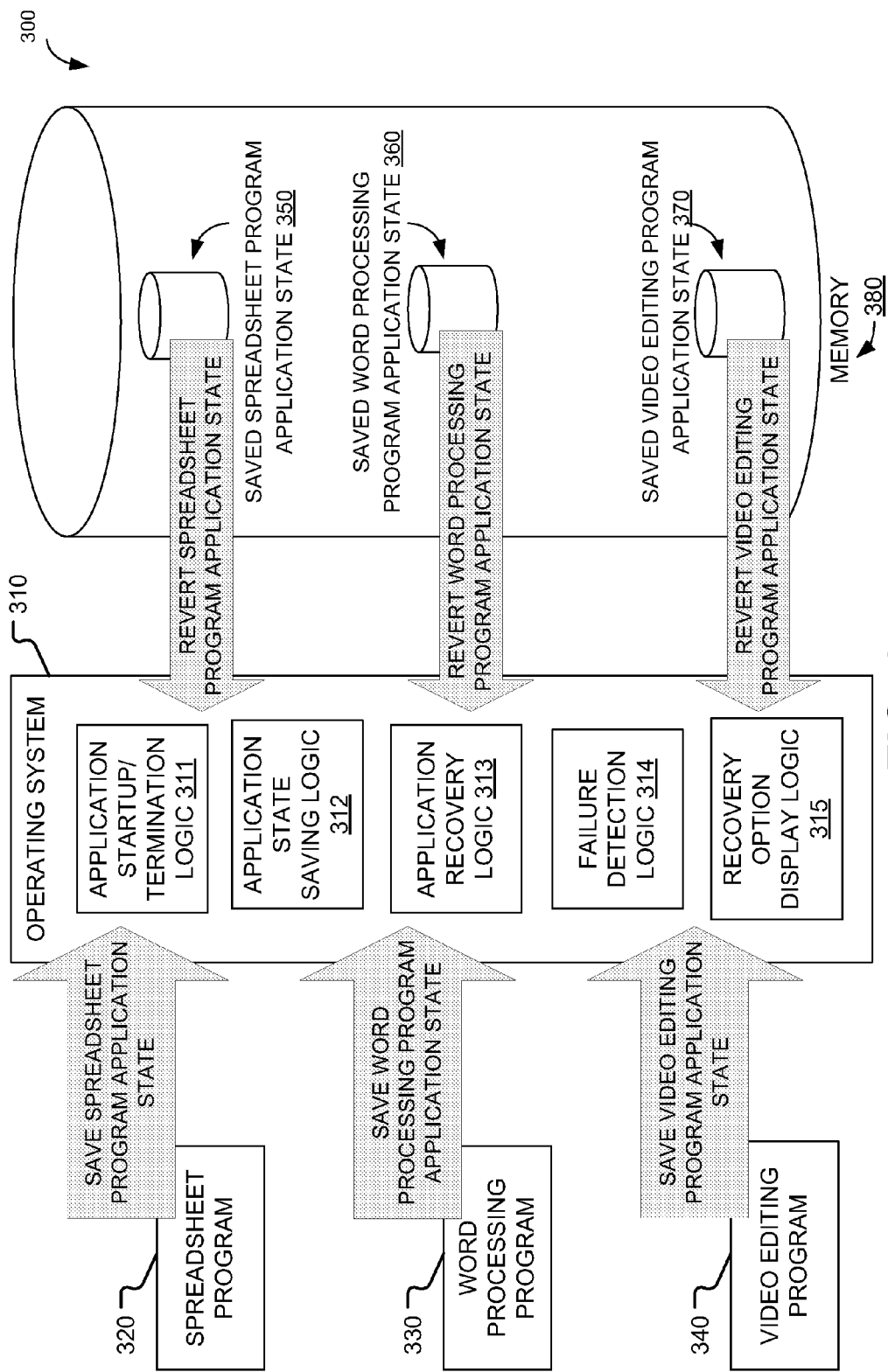
FIG. 3 is a block diagram of another particular embodiment of an operating system-based application recovery system.

FIG. 3 is a block diagram of another particular embodiment of an operating system-based application recovery system 300. In the embodiment illustrated in FIG. 3, the system 300 includes a spreadsheet program 320, a word processing program 330, and a video editing program 340. The spreadsheet program 320, the word processing program 330, and the video editing program 340 may also send and receive information to and from the operating system 310. The system 300 also includes a memory 380 in communication with the operating system 310 that may store data. In an illustrative embodiment, the operating system 310 may include the operating system 110 of FIG. 1, and the memory 380 may include the memory 140 of FIG. 1.

The operating system 310 may include application startup/termination logic 311, application state saving logic 312, application recovery logic 313, failure detection logic 314, and recovery option display logic 315. In a particular embodiment, the application startup/termination logic 311 functions similarly to the application startup/termination logic 111 of FIG. 1. The application state saving logic 312 functions similarly to the application state saving logic 112 of FIG. 1. The application recovery logic 313 functions similarly to the application recovery logic 113 of FIG. 1. The failure detection logic 314 functions similarly to the failure detection logic 314 of FIG. 1. The recovery option display logic 315 functions similarly to the recovery option display logic 115 of FIG. 1.

The memory 380 may be volatile memory attached to a computer or a non-volatile memory attached to a computer. Further, the memory 380 may be located at a network location remote from the computer. For example, when the memory 380 includes a volatile memory attached to the computer, the memory 380 may include a computer random access memory (RAM). As another example, when the memory 380 includes a non-volatile memory attached to the computer, the memory 380 may include a hard disk or a removable storage media. When the memory 380 includes a network location remote from the computer, the memory 380 may include a network storage drive remote from the computer. The memory 380 may be configured to concurrently store application states corresponding to multiple applications. For example, the memory 380 may store a saved spreadsheet program application state 350 corresponding to the spreadsheet program 320, a saved word processing program application state 360 corresponding to the word processing program 330, and a saved video editing program application state 370 corresponding to the video editing program 340. In an illustrative embodiment, the saved spreadsheet program application state 350, the saved word processing program application state 360, and the saved video editing program application state 370 may each include the saved application state 130 of FIG. 1 or the application state 210 of FIG. 2.

In operation, any combination of the spreadsheet program 320, the word processing program 330, and the video editing program 340 may execute simultaneously or one at a time, supported by the operating system 310. At various times, the operating system 310 may save the spreadsheet program application state to the memory 380 as the saved spreadsheet program application state 350, save the word processing program application state to the memory 380 as the saved word processing program application state 360, and save the video editing program application state to the memory as the saved video editing program application state 370.

In a particular embodiment, the operating system 310 may save application states one at a time. For example, the operating system 310 may save the application state for the spreadsheet program 320 before saving the application state for the word processing program 330 and save application state for the word processing program 330 before saving the application state for the video editing program 340. In another particular embodiment, the operating system 310 may save application states concurrently. For example, the operating system 310 may save the application state for the spreadsheet program 320, the word processing program 330, and the video editing program 340 at the same time.

In a particular embodiment, the operating system 310 may overwrite a previously saved application state for an application each time that application state for the application is saved. In another particular embodiment, the operating system 310 may not overwrite previously saved application states and the memory 380 may contain multiple application states for each application.

When the spreadsheet program 320, the word processing program 330, or the video editing program 340 fails, a previous application state may be recovered by the operating system 310. In a particular embodiment where the operating system 310 overwrites a previously saved application state for an application with a newly saved application state, recovering a failed application may include reverting the failed application to its most recently saved application state. For example, recovering the spreadsheet program 320 may include reverting the spreadsheet program 320 to the saved spreadsheet program application state 350. In another particular embodiment where the operating system 310 does not overwrite previously saved application states and the memory 380 contains multiple application states for a failed application, recovering the failed application may include giving a user an option to choose which of the multiple saved application states to revert the failed application to. For example, recovering the video editing program 340 may include displaying an option to select which of the multiple saved application states to revert the video editing program 340 to, receiving a user selection of one of the multiple saved application states, and reverting the video editing program 340 to the selected saved application state.

In a particular embodiment, each application may execute concurrently, and when one application fails, the failed application may be reverted to its saved application state without affecting the other applications. This reduces the disruption caused by an application failure and enables the non-failing applications to continue executing without significantly affecting performance. It will thus be appreciated that the system of FIG. 3 may provide operating system-based recovery functionality to multiple applications.

In another particular embodiment, when all of the applications fail due to a catastrophic event such as a computer failure, each of the applications may be reverted to their respective saved application states. For example, when the system of FIG. 3 is located at a computer and the computer crashes and must be rebooted, each of the applications 320, 330, and 340 may be reverted to their pre-crash application states following the reboot. It will thus be appreciated that the system of FIG. 3 may provide for a seamless resumption of computing following a catastrophic failure with reduced data loss or application state loss.

Figure 4:
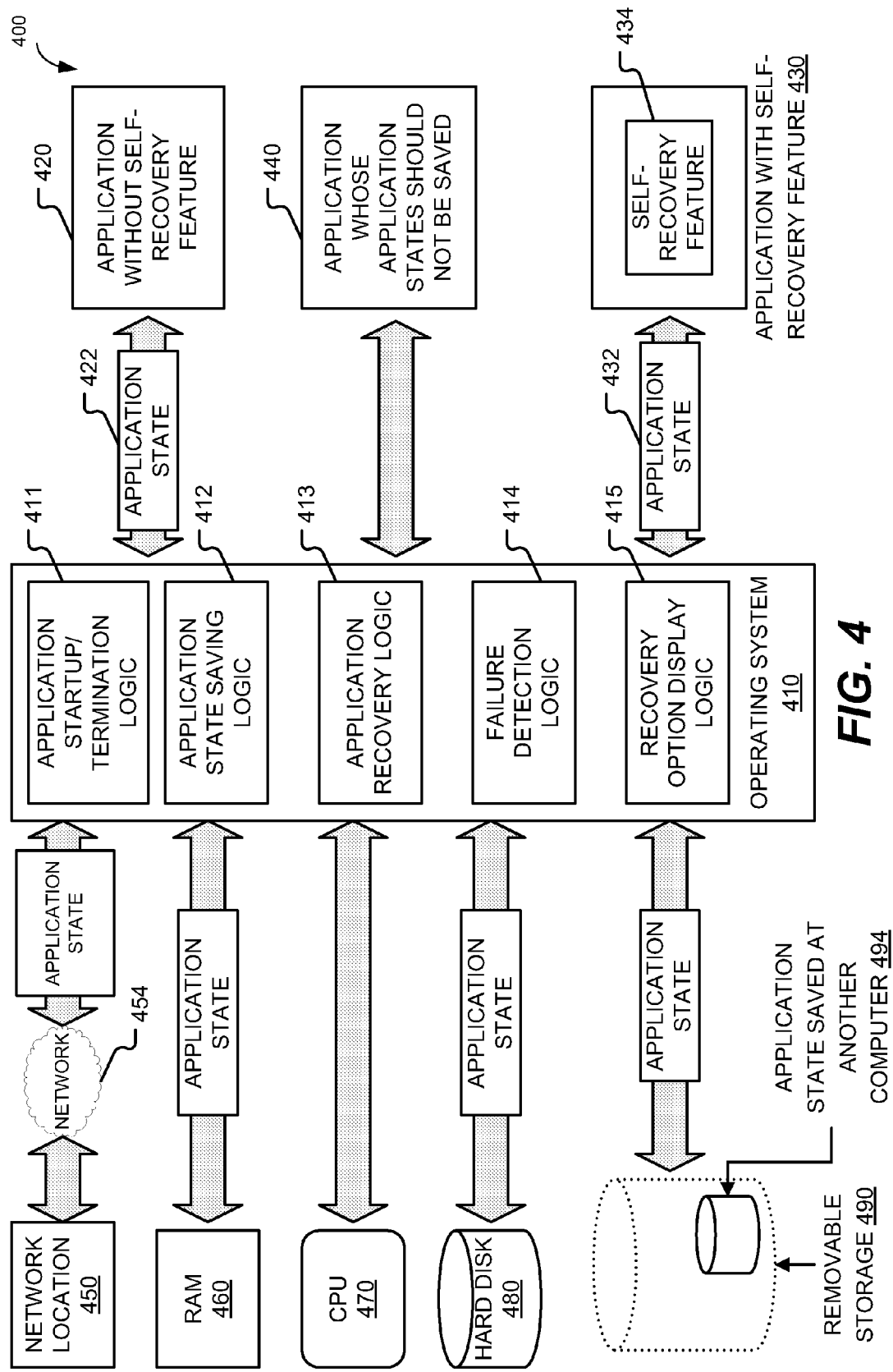
FIG. 4 is a block diagram of another particular embodiment of an operating system-based application recovery system.

FIG. 4 is a block diagram of another particular embodiment of an operating system-based application recovery system 400. The system 400 includes an application without a self-recovery feature 420, an application with a self-recovery feature 430, and an application whose application states should not be saved 440. Each of the applications 420, 430, and 440 is capable of sending data to and receiving data from an operating system 410. The system also includes a RAM 460, a CPU 470, a hard disk 480, and a removable storage 490, each of which is capable of sending data to and receiving data from the operating system 410. A network location 450 may also be accessed by the operating system 410 to store and retrieve data via a network 454. In an illustrative embodiment, the operating system 410 may include the operating system 110 of FIG. 1 or the operating system 310 of FIG. 3.

The operating system 410 may include application startup/termination logic 411, application state saving logic 412, application recovery logic 413, failure detection logic 414, and recovery option display logic 415. In a particular embodiment, the application startup/termination logic 411 functions similarly to the application startup/termination logic 111 of FIG. 1. The application state saving logic 412 functions similarly to the application state saving logic 112 of FIG. 1. The application recovery logic 413 functions similarly to the application recovery logic 113 of FIG. 1. The failure detection logic 414 functions similarly to the failure detection logic 114 of FIG. 1. The recovery option display logic 415 functions similarly to the recovery option display logic 115 of FIG. 1.

When the application without a self-recovery feature 420 executes, the operating system 410 may save an application state 422 for the application without a self-recovery feature 420 at various times. In the event of a failure, the application without a self-recovery feature 420 may not be able to self-recover. For example, the application without a self-recovery feature 420 may include the application 120 of FIG. 1, the spreadsheet program 320 of FIG. 3, the word processing program 330 of FIG. 3, or the video editing program 340 of FIG. 3.

When the application with a self-recovery feature 430 executes, the operating system 410 may save an application state 432 for the application with a self-recovery feature 430 at various times. In the event of a failure, the application with a self-recovery feature 430 may be able to recover itself via a separate self-recovery feature 434 when the application with a self-recovery feature 430 is restarted. In a particular embodiment, the self-recovery feature 434 may be unsuccessful in recovering the application 430 following the failure. In another particular embodiment, upon the failure of the application with a self-recovery feature 430, a user may choose between recovery by the operating system 410 (by selecting an option displayed by the operating system 410) and recovery by the self-recovery feature 434 (by not selecting the option displayed by the operating system 410, restarting the application 430, and executing the self-recovery feature 434). In an illustrative embodiment, the application with a self-recovery feature 430 may include the application 120 of FIG. 1, the spreadsheet program 320 of FIG. 3, the word processing program 330 of FIG. 3, or the video editing program 340 of FIG. 3.

The operating system 410 may not save application states for the application whose application states should not be saved 440. For example, the operating system 410 may not save application states for a particular application in response to receiving an indication that a user does not desire operating system-based application recovery for that particular application. A user may choose to bypass operating system-based application recovery for a particular application when the particular application has a self-recovery feature, when the application state for the particular application is large and takes a long time to save, or when the user simply wants to restart the particular application without any saved state information following a failure. In an illustrative embodiment, the application whose application states should not be saved 440 may include the application 120 of FIG. 1, the spreadsheet program 320 of FIG. 3, the word processing program 330 of FIG. 3, or the video editing program 340 of FIG. 3.

The RAM 460 may be configured to enable the operating system 410 to save application states to the RAM 460 and load application states from the RAM 460. Similarly, the hard disk 480 may be configured to enable the operating system 410 to save application states to the hard disk 480 and load application states from the hard disk 480, and the removable storage 490 may be configured to enable the operating system 410 to save application states to the removable storage 490 and load application states from the removable storage 490.

The network location 450 is accessible by the operating system 410 via the network 454. By way of example, and not limitation, the network 454 may be a local area network (LAN), a wide area network (WAN), or the Internet. The network location 450 may be a server, a computing device, or any other network location. The network location 450 may be configured to enable the operating system 410 to save the application state to the network location 450 via the network 454 and load the application state from the network location 450 via the network 454.

In operation, the application without a self-recovery feature 420, the application with a self-recovery feature 430, and the application whose application states should not be saved 440 may execute simultaneously or one at a time, supported by the operating system 410. At various times, the operating system 410 may save the application state of the application without a self-recovery feature 420 and the application with a self-recovery feature 430 to the network location 450, the RAM 460, the hard disk 480, and the removable storage 490, or any combination thereof. In the event of a failure associated with either the application without a self-recovery feature 420 or the application with a self-recovery feature 430, the operating system 410 may recover the failed application by loading a saved application state for the failed application from the network location 450, the RAM 460, the hard disk 480, or the removable storage 490.

It will be appreciated that the system of FIG. 4 enables the saving and loading of application states to and from various locations. The system of FIG. 4 may provide operating system-based application recovery even when a particular storage location for application states becomes defective. Additionally, the system of FIG. 4 enables a user to opt-out of operating system-based application recovery with respect to an individual application. For example, in the system of FIG. 4, a user may have opted out of operating system-based application recovery with respect to the application whose application state should not be saved 440. It will also be appreciated that the system of FIG. 4 provides the ability to save backup copies of application states by copying them from one storage location to another storage location. For example, a saved application state at the RAM 460 may be backed up by copying it to the hard disk 480.

In a particular embodiment, an application state may include data that may be used by an operating system to identify a particular computer or external device that stored the application state. For example, when the removable storage 490 is connected, the operating system 410 may determine that the application state 494 was saved at the removable storage 490 while the removable storage 490 was connected to a different computer or other external device. In response, the operating system 410 may display an option to recover an application at the computer to the application state saved at another computer 494. It will thus be appreciated that the system of FIG. 4 enables the transfer of application states between computing devices.

Figure 5:
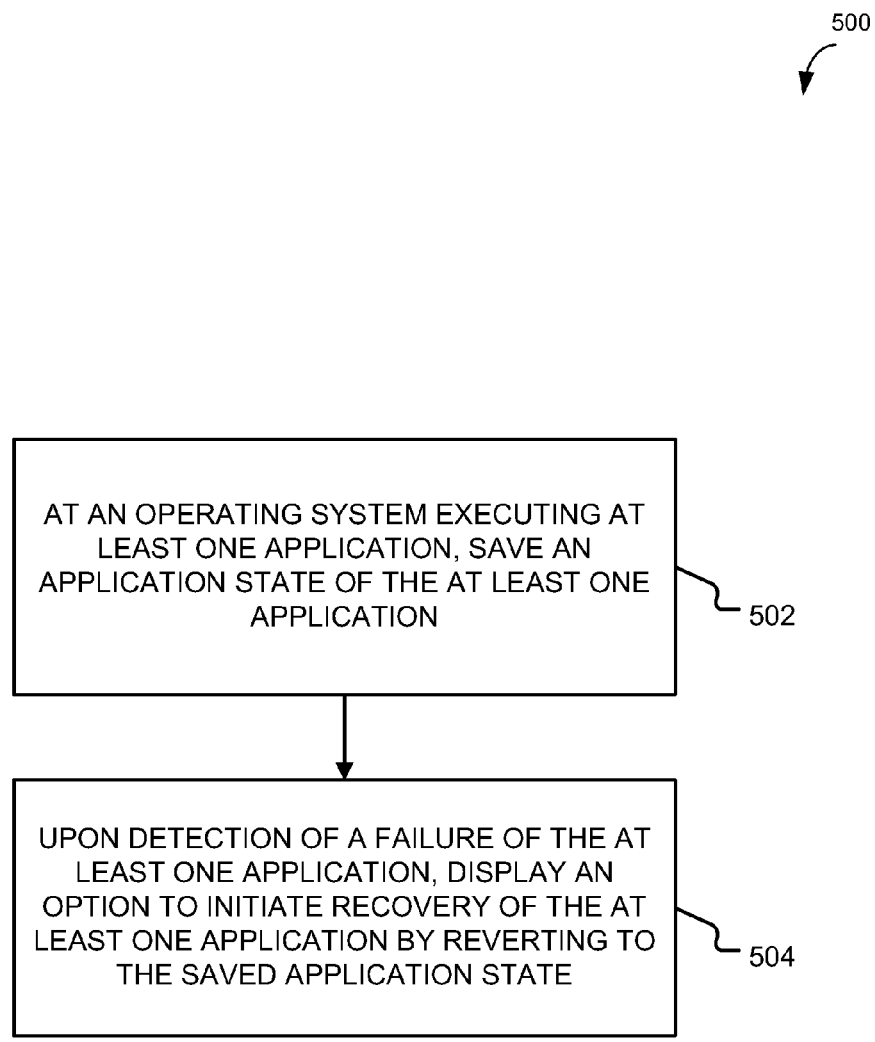
FIG. 5 is a flow diagram of a particular embodiment of a method of operating system-based application recovery.

FIG. 5 is a flow diagram of a particular embodiment of a method 500 of operating system-based application recovery. In an illustrative embodiment, the method 500 may be performed by the operating system 110 of FIG. 1, the operating system 310 of FIG. 3, or the operating system 410 of FIG. 4. The method 500 includes, at an operating system executing at least one application, saving an application state of the at least one application, at 502. For example, in FIG. 1, at the operating system 110 executing the application 120, the operating system 110 may save an application state of the application 120 as the saved application state 130 at the memory 140. The method 500 also includes, upon detection of a failure of the at least one application, displaying an option to initiate recovery of the at least one application by reverting to the saved application state, at 504. For example, in FIG. 1 the operating system 110 may detect a failure of the application 120 and display an option to initiate recovery of the application 120 by reverting to the saved application state 130 of FIG. 1.

It will be appreciated that the method 500 of FIG. 5 enables operating system-based application recovery. It will be noted that the method 500 of FIG. 5 is not restricted to a personal computer environment. It will also be noted that the method 500 of FIG. 5 is not limited to a particular type of operating system. Rather, the method 500 of FIG. 5 may be performed by various operating systems and may also be performed at a mobile communications device. Further, it will be appreciated that the method 500 of FIG. 5 may not depend on any particular characteristics of a failed application in order to successfully recover the failed application. Therefore, applications do not have to be re-programmed or re-compiled to be recoverable by the method 500 of FIG. 5.

Figure 6:
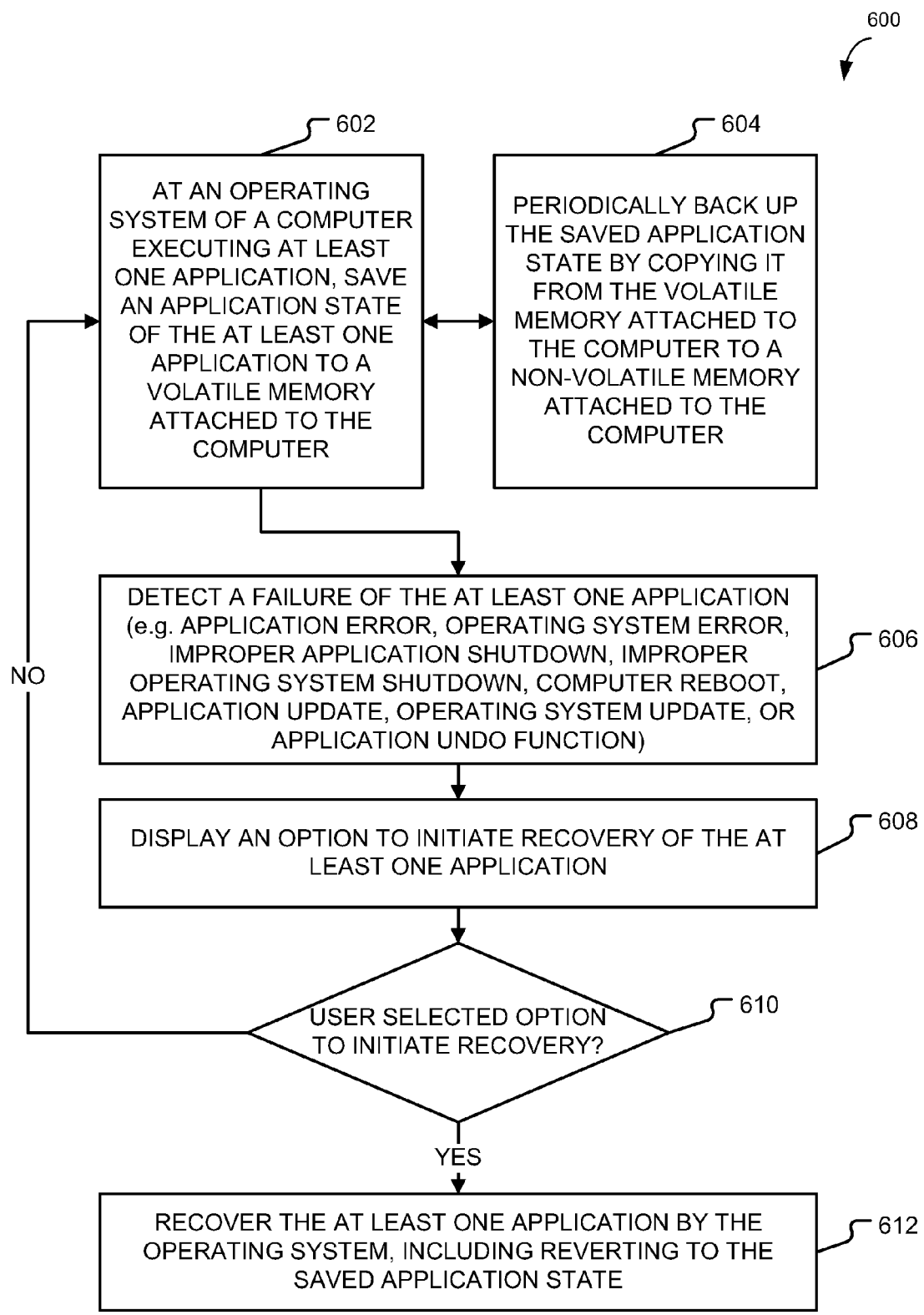
FIG. 6 is a flow diagram of another particular embodiment of a method of operating system-based application recovery.

FIG. 6 is a flow diagram of another particular embodiment of a method 600 of operating system-based application recovery. In an illustrative embodiment, the method 600 may be performed by the operating system 110 of FIG. 1, the operating system 310 of FIG. 3, or the operating system 410 of FIG. 4. The method 600 includes, at an operating system of a computer executing at least one application, saving an application state of the at least one application to a volatile memory attached to the computer. For example, in FIG. 4, the operating system 410 may save the application state 422 of the application without a self-recovery feature 420 to the RAM 460. The method 600 also includes periodically backing up the saved application state by copying the saved application state from the volatile memory attached to the computer to a non-volatile memory attached to the computer, at 604. For example, the operating system 410 of FIG. 4 may periodically back up the saved application state by copying the saved application state from the RAM 460 to the hard disk 480. The method 600 also includes detecting a failure of the at least one application, at 606. By way of example, and not limitation, the failure of the at least one application may be due to an application error, an operating system error, an improper application shutdown, an improper operating system shutdown, a computer reboot, an application update, an operating system update, or an application undo function. For example, the operating system 410 of FIG. 4 may detect a failure of the application without a self-recovery feature 420 of FIG. 4 due to an application error.

The method 600 also includes displaying an option to initiate recovery of the at least one application, at 608. For example, the recovery option display logic 415 of FIG. 4 at the operating system 410 may display an option to initiate recovery of the application without a self-recovery feature 420. In a particular embodiment where the operating system 410 of FIG. 4 does not overwrite previously saved application states, the recovery option display logic 415 may display an option to revert the application without a self-recovery feature 420 to one of multiple saved application states.

The method 600 also includes determining whether a user selected the option to initiate recovery, at 610. When the user selects the option to initiate recovery, the method 600 includes recovering the at least one application by the operating system, including reverting to the saved application state, at 612. For example, in FIG. 4, when the user selects the option to initiate recovery, the operating system 410 may recover the application without a self-recovery feature 420 by reverting to the saved application state. When the user does not select the option to initiate recovery, the method 600 includes returning to 602, without recovering the at least one application by the operating system of the computer.

It will be appreciated that the method 600 of FIG. 6 enables the backing up of application states, providing data redundancy in the case of hardware failure. It will also be appreciated that the method 600 of FIG. 6 provides computer users with the option to bypass the operating system-based recovery of applications. A user may wish to bypass operating system-based recovery of a particular application when the particular application has its own self-recovery feature, when the application state for the particular application is large and takes a long time to save, or when the user simply wants to restart the particular application without any saved state information following a failure.

Figure 7:
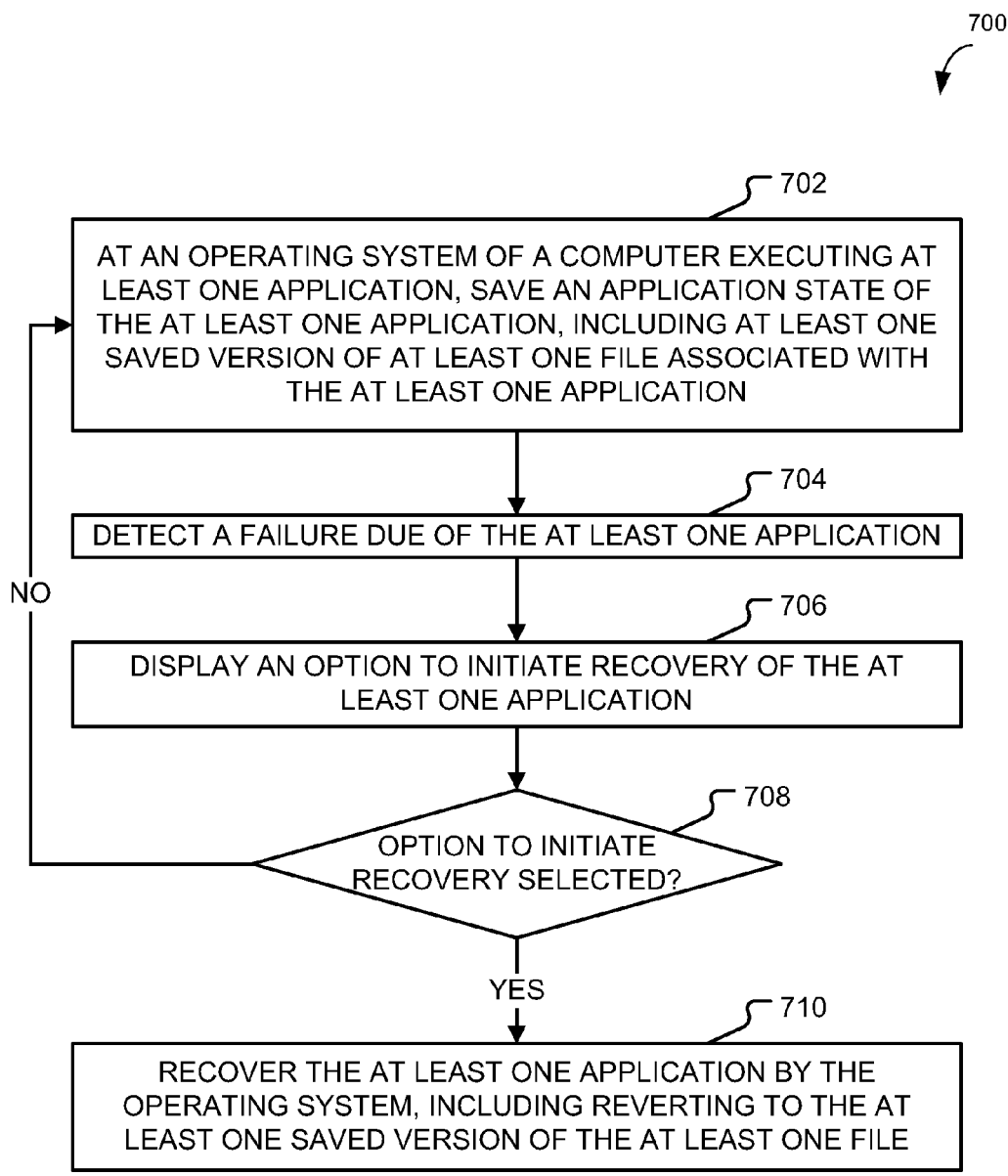
FIG. 7 is a flow diagram of another particular embodiment of a method of operating system-based application recovery.

FIG. 7 is a flow diagram of another particular embodiment of a method 700 of operating system-based application recovery. In an illustrative embodiment, the method 700 may be performed by the operating system 110 of FIG. 1, the operating system 310 of FIG. 3, or the operating system 410 of FIG. 4. The method 700 may be used to recover files associated with an application that may become corrupted due to an application failure.

The method 700 includes, at an operating system of a computer executing at least one application, saving an application state of the at least one application, at 702. At least one saved version of at least one file associated with the at least one application may also be saved. For example, the operating system 110 of FIG. 1 may save an application state of the application 120, including at least one version of a file associated with the application 120. The method 700 also includes detecting a failure of the at least one application, at 704. For example, the operating system 110 of FIG. 1 may detect a failure of the application 120. The method 700 also includes displaying an option to initiate recovery of the at least one application, at 706. For example, the recovery option display logic 115 of FIG. 1 at the operating system 110 may display an option to initiate recovery of the application 120. The method 700 also includes determining whether the option to initiate recovery was selected, at 708. For example, the operating system 110 of FIG. 1 may determine whether the option to initiate recovery of the application 120 was selected. When the option to initiate recovery is not selected, the method 700 includes returning to 702, without recovering the application by the operating system. When the option to initiate recovery is selected, the method 700 includes recovering the at least one application by the operating system, including reverting to the at least one saved version of the at least one file, at 710. For example, when the operating system 110 of FIG. 1 determines that the option to recover the at least one file associated with the application 120 was selected, the operating system 110 may recover the application 120, including reverting to the at least one saved version of the at least one file associated with the application 120.

It will be appreciated that the method 700 of FIG. 7 provides operating system-based recovery of an application, including operating system-based recovery of files associated with the application. Operating system-based recovery of files associated with the application enables the recovery of files that may be corrupted during application failures. It will therefore be appreciated that the method 700 of FIG. 7 enables users to resume work in an application after the application fails without losing all of the changes they may have previously made to files associated with the application.

Figure 8:
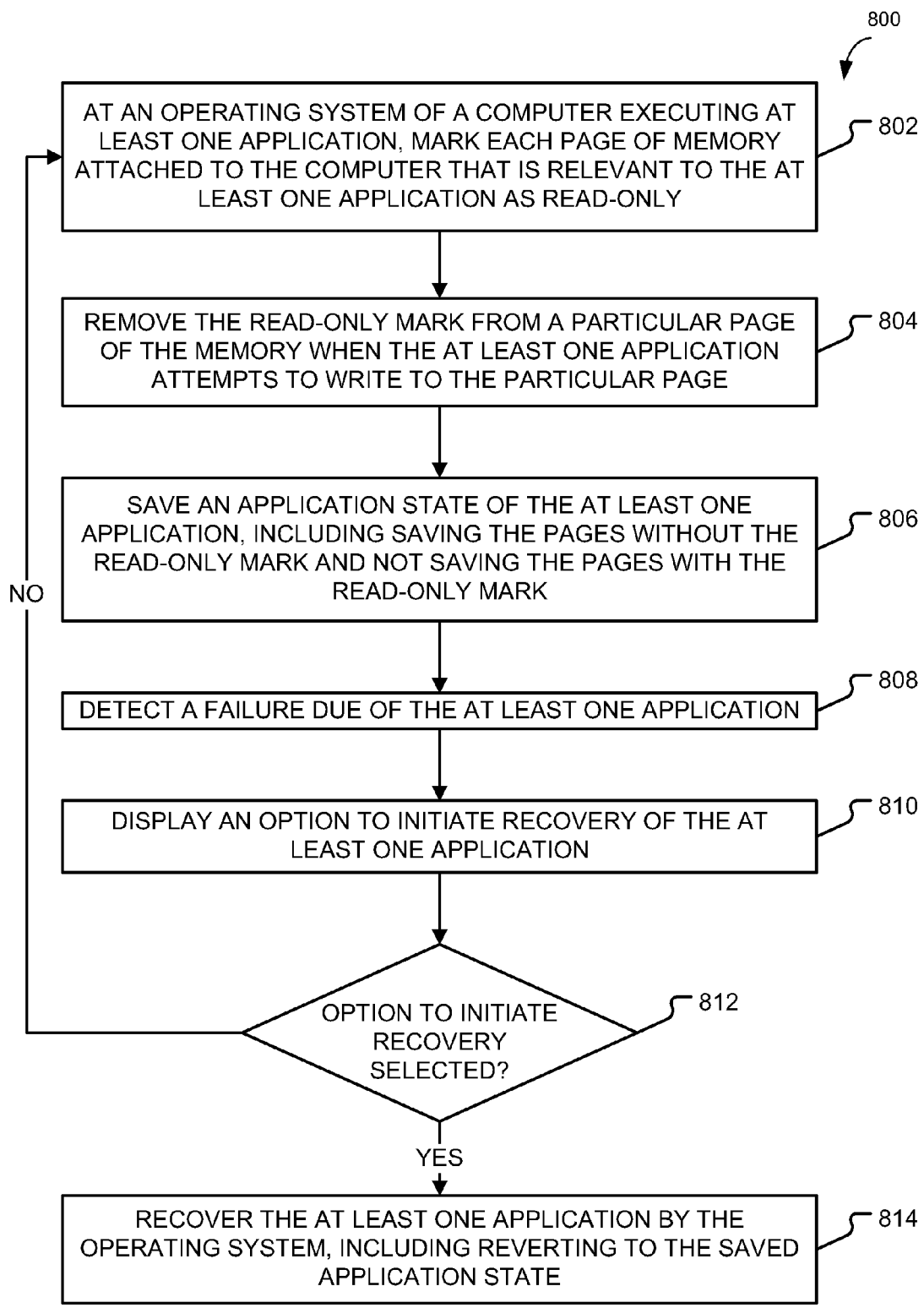
FIG. 8 is a flow diagram of another particular embodiment of a method of operating system-based application recovery.

FIG. 8 is a flow diagram of another particular embodiment of a method 800 of operating system-based application recovery. In an illustrative embodiment, the method 800 may be performed by the operating system 110 of FIG. 1, the operating system 310 of FIG. 3, or the operating system 410 of FIG. 4. The method 800 includes, at an operating system of a computer executing at least one application, marking each page of a memory attached to the computer that is relevant to the at least one application as read-only, at 802. For example, when the RAM 460 of FIG. 4 includes certain pages that are relevant to the application without a self-recovery feature 420, the operating system 410 may mark those pages of the RAM 460 as read-only. As discussed below, the read-only marks may be used by an operating system to track particular pages of memory that are modified by an application, enabling the operating system to save application states for the application more efficiently by saving only those pages of the memory that have been modified by the application.

The method 800 also includes removing the read-only mark from a particular page of the memory when the at least one application attempts to write to the particular page, at 804. For example, the operating system 410 of FIG. 4 may remove the read-only mark from a particular page of the RAM 460 when the application without a self-recovery feature 420 attempts to write to the particular page of the RAM 460. The method 800 also includes saving an application state of the at least one application, at 806. Saving the application state of the at least one application includes saving the pages without the read-only mark and not saving the pages with the read-only mark. For example, the operating system 410 of FIG. 4 may save an application state 422 of the application without a self-recovery feature 420, including saving the pages of the RAM 460 without the read-only mark and not saving the pages of the RAM 460 with the read-only mark. The method 800 also includes detecting a failure of the at least one application, at 808. For example, the operating system 410 of FIG. 4 may detect a failure of the application without a self-recovery feature 420. The method 800 also includes displaying an option to initiate recovery of the at least one application, at 810. For example, the operating system 410 of FIG. 4 may display an option to recover the application without a self-recovery feature 420.

The method 800 also includes determining whether the option to initiate recovery was selected, at 812. For example, the operating system 410 of FIG. 4 may determine whether the option to initiate recovery of the application without the self-recovery feature 420 was selected. When it is determined that the option to initiate recovery was selected, the method 800 includes recovering the at least one application by the operating system, including reverting to the saved application state, at 814. For example, when the operating system 410 of FIG. 4 determines that the option to initiate recovery of the application without a self-recovery feature 420 was selected, the operating system 410 may recover the application without a self-recovery feature 420 by reverting to the saved application state 422. When it is determined that the option to initiate recovery was not selected, the method 800 returns to 802.

It will be appreciated that the method 800 of FIG. 8 enables an operating system, through the use of read-only flags, to save at an application state for an application just those pages of memory that have been modified by the application. This reduces the amount of data that is saved each time an application state is saved. In a particular embodiment, after an operating system has saved pages without a read-only mark to an application state, the operating system may once again mark those pages as read-only. By doing so, the operating system only saves those pages to an application state that have been written to by an application since the previous time an application state for the application was saved. This further reduces the amount of data saved each time an application state is saved. In another particular embodiment, all of the pages of memory relevant to an application are marked read-only by the operating system when an application begins execution, and the pages are not re-marked as read-only once they are saved to an application state. In this case, each time an application state for the application is saved, the application state will include all of the pages of memory that have been modified since the application began execution. That is, each time an application state is saved, the application state includes a cumulative record of memory pages modified by the application.

It will further be appreciated that read-only flags, such as those used by the method 800 of FIG. 8, may also be used to amortize the cost of saving the memory pages for an application. For example, when saving an application state, instead of actually saving memory pages for the application, an operating system may instead merely mark the memory pages as read-only. Subsequently, whenever the application attempts to modify a particular memory page that is marked read-only, the particular memory page may be copied into the application state that was stored earlier. Thus, the cost of saving the memory pages for an application may be incurred over a period of time instead of being incurred all at once, further reducing the performance impact of saving application states.

Figure 9:
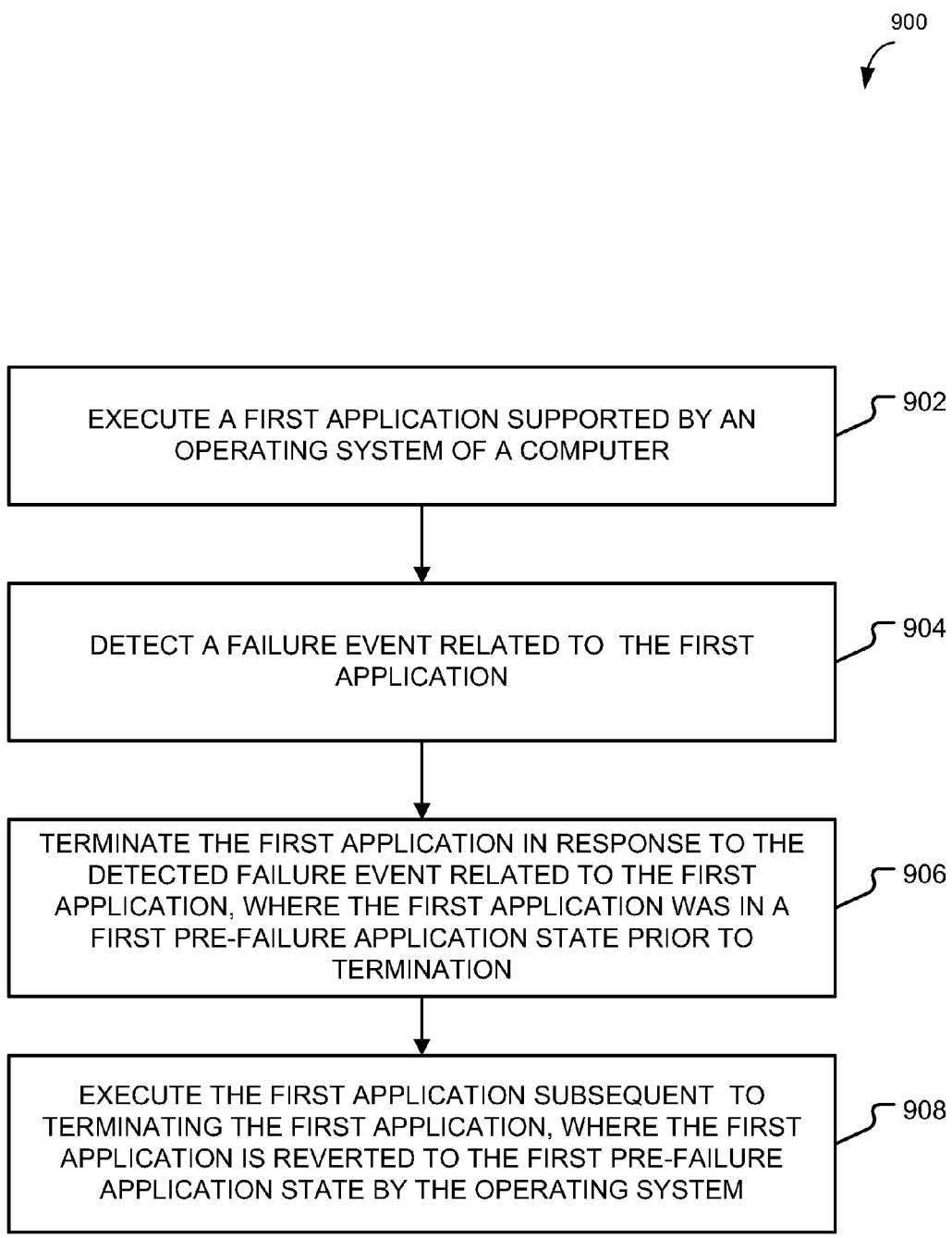
FIG. 9 is a flow diagram of another particular embodiment of a method of operating system-based application recovery.

FIG. 9 is a flow diagram of another particular embodiment of a method 900 of operating system-based application recovery. In an illustrative embodiment, the method 900 may be performed by the operating system 110 of FIG. 1, the operating system 310 of FIG. 3, or the operating system 410 of FIG. 4. The method 900 includes executing a first application supported by an operating system of a computer, at 902. For example, the operating system 110 1 may execute the application 120. The method 900 also includes detecting a failure event related to the first application, at 904. For example, the operating system 110 of FIG. 1 may detect a failure event related to the application 120. The method 900 also includes terminating the first application in response to the detected failure event related to the first application, at 906. The first application was in a first pre-failure application state prior to termination. For example, the operating system 110 of FIG. 1 may terminate the application 120, where the application 120 was in an application state that was just saved at the memory 140 as the saved application state 130. The method 900 also includes executing the first application subsequent to terminating the first application, where the first application is reverted to the first pre-failure application state by the operating system, at 908. For example, operating system 110 of FIG. 1 may execute the application 120 after reverting the application 120 to the saved application state 130.

It will be appreciated that the method 900 of FIG. 9 provides for operating system-based application recovery. It will further be appreciated that the method 900 of FIG. 9 provides for the operating system-based recovery of applications that do not have any recovery features of their own, as well as the operating system-based recovery of applications that have their own self-recovery feature. This enables the method 900 of FIG. 9 to effectively add recovery functionality to both applications that have been developed without any self-recovery feature as well as applications whose self-recovery feature is functioning incorrectly or erroneously.

Figure 10:
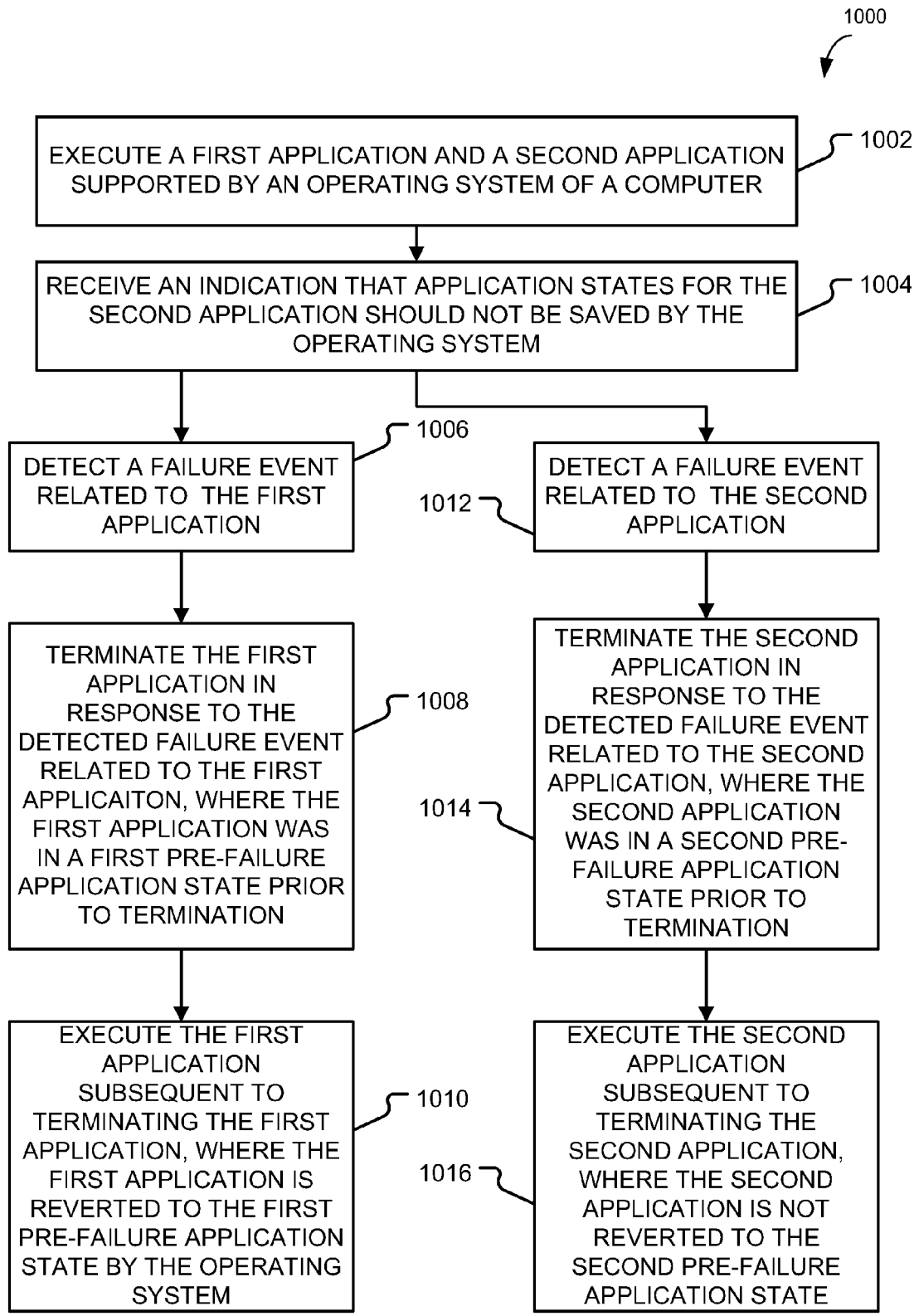
FIG. 10 is a flow diagram of another particular embodiment of a method of operating system-based application recovery.

FIG. 10 is a flow diagram of another particular embodiment of a method 1000 of operating system-based application recovery. In an illustrative embodiment, the method 1000 may be performed by the operating system 110 of FIG. 1, the operating system 310 of FIG. 3, or the operating system 410 of FIG. 4. The method 1000 includes executing a first application and a second application supported by an operating system of a computer, at 1002. For example, the operating system 310 of FIG. 3 may execute the spreadsheet program 320 and the video editing program 340. The method 1000 also includes receiving an indication that application states for the second application should not be saved by the operating system. For example, the operating system 310 of FIG. 3 may receive an indication that application states for the video editing program 340 should not be saved. The method 1000 also includes two paths—a path for the first application that includes 1006, 1008, and 1010, and a path for the second application that includes 1012, 1014, and 1016. The two paths may occur separately or together.

In the path for the first application, the method 1000 includes detecting a failure event related to the first application, at 1006. For example, the operating system 310 of FIG. 3 may detect a failure event related to the spreadsheet program 320. The method 1000 also includes terminating the first application in response to the detected failure event related to the first application, at 1008. The first application was in a first pre-failure application state prior to termination. For example, the operating system 310 of FIG. 3 may terminate the spreadsheet program 320, where the spreadsheet program 320 was in an application state that was just saved at the memory 380 as the saved spreadsheet program application state 350. The method 1000 also includes executing the first application subsequent to terminating the first application, where the first application is reverted to the first pre-failure application state by the operating system, at 1010. For example, the operating system 310 of FIG. 3 may execute the spreadsheet program 320 after reverting the spreadsheet program 320 to the saved spreadsheet program application state 350.

In the path for the second application, the method 1000 includes detecting a failure event related to the second application, at 1012. For example, the operating system 310 of FIG. 3 may detect a failure event related to the video editing program 340. The method 1000 also includes terminating the second application in response to the detected failure event related to the second application, at 1014. The second application was in a second pre-failure application state prior to termination. For example, the operating system 310 of FIG. 3 may terminate the video editing program 340, where prior to termination, the video editing program 340 was in an particular application state that was not saved by the operating system 310. The method 1000 also includes executing the second application subsequent to terminating the second application, where the second application is not reverted to the second pre-failure application state, at 1016. For example, the operating system 310 of FIG. 3 may execute the video editing program 340 without reverting the video editing program 340 to the particular application state the video editing program 340 was in prior to being terminated.

It will be appreciated that the method 1000 of FIG. 10 provides users with the ability to choose, on a per application basis, whether operating system-based application recovery should be implemented. This allows users improved control over operating system behavior with respect to particular applications, and may result in improved performance. For example, a user may choose not to have operating system-based application recovery for an application whose application states are large and therefore take a long time to save.

Figure 11:
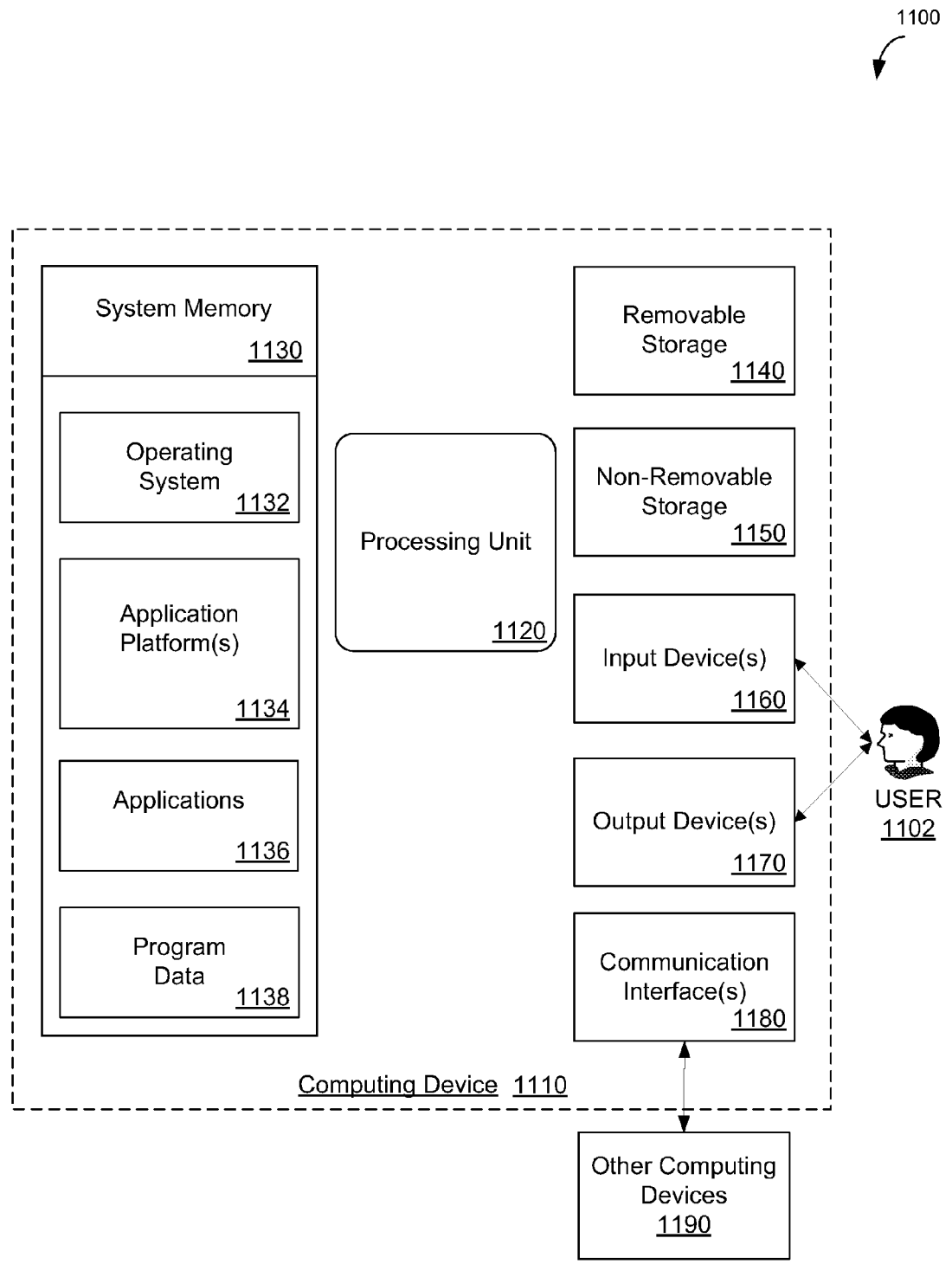
FIG. 11 is a block diagram of a computing environment including a computing device to support embodiments of computer-implemented methods, computer program products, and system components as illustrated in FIGS. 1-10.

FIG. 11 is a block diagram of a computing environment 1100 including a computing device 1110 operable to support embodiments of computer-implemented methods, computer program products, and system components according to the present disclosure. In a basic configuration, the computing device 1110 may incorporate the systems of FIG. 1, FIG. 3, or FIG. 4.

The computing device 1110 typically includes at least one processing unit 1120 and system memory 1130. Depending on the exact configuration and type of computing device, the system memory 1130 may be volatile (such as random access memory or "RAM"), non-volatile (such as read-only memory or "ROM," flash memory, and similar memory devices that maintain the data they store even when power is not provided to them) or some combination of the two. In a particular embodiment, the system memory 1130 may include the memory 140 of FIG. 1, the memory 380 of FIG. 3, or the RAM 460 of FIG. 4. The system memory 1130 typically includes an operating system 1132, one or more application platforms 1134, one or more applications 1136, and may include program data 1138. In a particular embodiment, the operating system 1132 may include the operating system 110 of FIG. 1, the operating system 310 of FIG. 3, or the operating system 410 of FIG. 4. In another particular embodiment, the one or more applications 1136 may include the application 120 of FIG. 1, the spreadsheet program 320 of FIG. 3, the word processing program 330 of FIG. 3, the video editing program 340 of FIG. 3, the application without a self-recovery feature 420 of FIG. 4, the application with a self recovery feature 430 of FIG. 4, or the application whose application states should not be saved 440 of FIG. 4. In another particular embodiment, the program data 1138 may include data that is saved when an application state, such as the application state 210 of FIG. 2, is saved.

The computing device 1110 may also have additional features or functionality. For example, the computing device 1110 may also include removable and/or non-removable additional data storage devices such as magnetic disks, optical disks, tape, and standard-sized or miniature flash memory cards. Such additional storage is illustrated in FIG. 11 by removable storage 1140 and non-removable storage 1150. In a particular embodiment, the non-removable storage 1150 may include the hard disk 480 of FIG. 4. In another particular embodiment, the removable storage 1150 may include the removable storage 490 of FIG. 4. Computer storage media may include volatile and/or non-volatile storage and removable and/or non-removable media implemented in any method or technology for storage of information such as computer-readable instructions, data structures, program components or other data. The system memory 1130, the removable storage 1140 and the non-removable storage 1150 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium which can be used to store the desired information and which can be accessed by computing device 1110. Any such computer storage media may be part of the device 1110. The computing device 1110 may also have input device(s) 1160 such as a keyboard, mouse, pen, voice input device, touch input device, etc. Output device(s) 1170 such as a display, speakers, printer, etc. may also be included. A user 1102 of the computing device 1110 may interact with the computing device 1110 through the output device(s) 1170 and input device(s) 1160. For example, the user 1110 may be presented with an option to initiate recovery of an application of an application by the operating system 1132 at the output device(s) 1170, and the user 1110 may use the input device(s) 1160 to select the option to initiate recovery of the application by the operating system 1132.

The computing device 1110 also contains one or more communication connections 1180 that allow the computing device 1110 to communicate with other computing devices 1190, such as one or more client computing systems or other servers, over a wired or a wireless network. In a particular embodiment, the computing device 1110 may use the communication connections 1180 to communicate with the network location 450 of FIG. 4 via the network 454. The one or more communication connections 1180 are an example of communication media. By way of example, and not limitation, communication media may include wired media such as a wired network or direct-wired connection, and wireless media such as acoustic, RF, infrared and other wireless media. It will be appreciated, however, that not all of the components or devices illustrated in FIG. 11 or otherwise described in the previous paragraphs are necessary to support embodiments as herein described.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   at an operating system of a computer executing at least one application, saving an application state of a first application;
   upon detection of a failure of the at least one application, displaying an option to initiate recovery of the first application by reverting to the saved application state;
   detecting that an external storage device has been connected to the computer;
   identifying a saved external application state on the external storage device, wherein the saved external application state is associated with a second application and includes data indicating that the saved external application state was saved while the external storage device was connected to a different computer; and
   displaying an option to initiate recovery of the second application by reverting to the saved external application state.

2. The method of claim 1, wherein the at least one application does not include a self-recovery feature.

3. The method of claim 1, wherein the at least one application includes a self-recovery feature.

4. The method of claim 1, further comprising:
   receiving a user selection of the option to initiate recovery of the at least one application; and
   recovering the at least one application by the operating system, including reverting to the saved application state.

5. The method of claim 1, wherein the application state of the at least one application is saved at fixed time intervals.

6. The method of claim 1, wherein the application state includes operating system entity information related to operating system entities associated with the at least one application.

7. The method of claim 6, wherein the operating system entity information includes open windows associated with the at least one application, graphical user interface (GUI) handles associated with the at least one application, file handles associated with the at least one application, semaphores associated with the at least one application, or any combination thereof.

8. The method of claim 1, wherein the application state includes address space information related to the at least one application comprising virtual memory information, physical memory information, page table information, or any combination thereof.

9. The method of claim 1, wherein the application state includes a process state of at least one process executing on the computer that is relevant to the at least one application and a call-stack of at least one thread relevant to the at least one application.

10. The method of claim 1, wherein the application state of the at least one application is saved at a memory attached to the computer.

11. The method of claim 1, wherein the application state of the at least one application is saved at a network location accessible by the computer.

12. The method of claim 1, wherein the computer includes a volatile memory and a non-volatile memory, wherein the application state is saved at the volatile memory, and further comprising periodically backing up the application state by copying the application state from the volatile memory to the non-volatile memory.

13. The method of claim 1, wherein the failure includes an error associated with the at least one application, an operating system error, an improper shutdown of the at least one application, an improper operating system shutdown of the operating system, a reboot of the computer, an application update, an operating system update, an undo function of the at least one application, or any combination thereof.

14. The method of claim 1, wherein the application state includes at least one saved version of at least one file associated with the application.

15. The method of claim 14, wherein reverting to the saved application state includes reverting to the at least one saved version of the at least one file.

16. The method of claim 1, wherein the first application is different than the second application.

17. The method of claim 1, wherein the first application is the same as the second application.

18. A system comprising:
   at least one memory; and
   an operating system, wherein the operating system is capable of:
      initiating execution of at least one application;
      saving at least one application state associated with the at least one application to the at least one memory;
      detecting a failure event;
      terminating the at least one application upon detection of the failure event; and
      displaying an option to restore the at least one application following the failure event by loading the at least one application state from the at least one memory;
   wherein:
      the at least one memory comprises a plurality of pages;
      the operating system is further capable of marking each page of the plurality of pages that is relevant to the at least one application as read-only and removing the read-only mark from a particular page of the plurality of pages when the at least one application attempts to write to the particular page; and
      saving the at least one application state comprises saving the pages of the plurality of pages without the read-only mark without saving the pages of the plurality of pages with the read-only mark.

19. A tangible computer-readable medium comprising instructions, that when executed by a computer, cause the computer to:
   execute a first application supported by an operating system of the computer;
   detect a failure event related to the first application;
   terminate the first application in response to the detected failure event related to the first application, wherein the first application was in a first pre-failure application state prior to termination;

execute the first application subsequent to terminating the first application, wherein the first application is reverted to the first pre-failure application state by the operating system;
receive an indication that application states for a second application should not be saved;
execute the second application supported by the operating system of the computer;
detect a failure event related to the second application;

terminate the second application in response to the detected failure event related to the second application, wherein the second application was in a second pre-failure application state prior to termination; and
execute the second application subsequent to terminating the second application, wherein the second application is not reverted to the second pre-failure application state.

* * * * *